US005212802A

United States Patent [19]

Matsumoto

[11] Patent Number: 5,212,802

[45] Date of Patent: May 18, 1993

[54] IMAGE FORMING APPARATUS ASSESSING WHETHER IT IS NECESSARY TO INSTALL ADDITIONAL PERIPHERAL DEVICE AND INFORMING AN OPERATOR TO THAT EFFECT

[75] Inventor: Manabu Matsumoto, Nara, Japan

[73] Assignee: Sharp Kabushiki Kaisha, Osaka, Japan

[21] Appl. No.: 486,751

[22] Filed: Mar. 1, 1990

[30] Foreign Application Priority Data

Mar. 2, 1989 [JP] Japan .................................... 1-51755
May 24, 1989 [JP] Japan .................................... 1-131191
Jun. 14, 1989 [JP] Japan .................................... 1-151090

[51] Int. Cl.[5] .................................................. G06F 9/06

[52] U.S. Cl. ............................... 395/800; 364/DIG. 2; 364/932.7; 364/939.6; 364/921.9; 355/202

[58] Field of Search ................ 395/800; 355/202, 203, 355/207, 218

[56] References Cited

U.S. PATENT DOCUMENTS 3,893,175 7/1975 Solomon ............................ 355/202
4,442,505 4/1984 Takano ............................... 364/900

FOREIGN PATENT DOCUMENTS 60-112545 6/1985 Japan .

OTHER PUBLICATIONS

Patent Abstracts of Japan, vol. 11, No. 22 (P-538) (2469) 21, Jan. 1987, & JP-A-61 196258 (Toshiba K.K.) 30 Aug. 1986, the whole document.
Patent Abstracts of Japan, vol. 10, No. 7 (P-419) (2064) 11 Jan. 1986, & JP-A-60 162266 (Fuji Xerox K.K.) 24 Aug. 1985, the whole document.
EP-A-0208340 (Mita Industrial Co. Ltd.); claim 1; FIG. 2.

*Primary Examiner*—Thomas C. Lee
*Assistant Examiner*—Mehmet Geckil

[57] ABSTRACT

An image forming apparatus allowing the optional mounting of an appropriate peripheral device to the size and the quantity of sheets. The necessity of employing a particular peripheral device is assessed on the basis of the past copying data records which are traced back so as to determine the necessity of the peripheral device.

6 Claims, 12 Drawing Sheets

| CONTINUOUS COPYING RATE : D' | TABLE DATA : F |
|---|---|
| 0 | 40 |
| 1 | 25 |
| 2 | 15 |
| 3 | 10 |
| 4 | 7 |
| 5 | 5 |
| 6 | 4 |
| 7 | 4 |
| 8 | 3 |
| 9 | 3 |
| 10 | 2 |

FIG. 3

| ADDRESS | DATE | PAPER SIZE | CASSETTE CAPACITY | COVER CONDITION | SORTER CONDITION | NUMBER OF COPIES |
|---|---|---|---|---|---|---|
| ---------- | ---------- | ---------- | ---------- | ---------- | ---------- | ---------- |
| 1497 | 5.20 | B4 | | CLOSED | | 3 |
| 1498 | 5.20 | A4 | | CLOSED | | 5 |
| 1499 | 5.20 | A4 | | CLOSED | | 5 |
| 149A | 5.20 | A4 | | CLOSED | | 5 |
| 149B | 5.21 | B5 | | CLOSED | | 1 |
| 149C | 5.21 | B4 | | OPEN | | 2 |
| 149D | | | | | | |
| ---------- | ---------- | ---------- | ---------- | ---------- | ---------- | ---------- |

CONTINUOUS COPYING (addresses 1498–149A)

FIG. 4A

| RAM ADDRESS (SEXA-DECIMAL) | DATE DATA (9bit) | |
|---|---|---|
| | MONTH (4 bit) | DAY (5 bit) |
| 0000 | | |
| 1FFF | | |

FIG. 4B

| RAM ADDRESS (SEXA-DECIMAL) | DAY | PAPER SIZE DATA (3 bit) | CASSETTE CAPACITY DATA (3 bit) |
|---|---|---|---|
| 2000 | | | |
| 3FFF | | | |

FIG. 4C

| RAM ADDRESS (SEXA-DECIMAL) | COVER DATA (2 bit) | SORTER DATA (2 bit) | COPY NUMBER DATA 100TH ORDER (4 bit) |
|---|---|---|---|
| 4000 | | | |
| 5FFF | | | |

FIG. 4D

| RAM ADDRESS (SEXA-DECIMAL) | COPY NUMBER DATA (12 bit) | |
|---|---|---|
| | 10TH ORDER (4 bit) | 1ST ORDER (4 bit) |
| 6000 | | |
| 7FFF | | |

FIG. 7A

| ADDRESS (SEXA-DECIMAL) | PAPER SIZE DATA | CASSETTE CAPACITY DATA | NON-PAPER DATA | COPY NUMBER DATA |
|---|---|---|---|---|
| 0000 | 011 | 0 0 | 0 | 0 0 |
| ⋮ | ⋮ | ⋮ | ⋮ | ⋮ |
| 0FFF | 001 | 0 1 | 1 | 0 0 |

FIG. 7B

| ADDRESS (SEXA-DECIMAL) | COPY NUMBER DATA |
|---|---|
| 1000 | 00010100 |
| ⋮ | ⋮ |
| 1FFF | 01100100 |

FIG. 8A

| PAPER SIZE | DATA |
|---|---|
| B5L | 0 0 0 |
| B5R | 0 0 1 |
| A4L | 0 1 0 |
| A4R | 0 1 1 |
| B4 | 1 0 0 |
| A3 | 1 0 1 |
| ETC. | 1 1 0 |
| ——— | 1 1 1 |

FIG. 8B

| CASSETTE CAPACITY | DATA |
|---|---|
| MANUAL | 0 0 |
| 500 | 0 1 |
| 1000 | 1 0 |
| 2500 | 1 1 |

FIG.10A

| MONTH | DATA |
| --- | --- |
| — | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| — | 1101 |
| — | 1110 |
| — | 1111 |

FIG.10B

| DAY | DATA |
| --- | --- |
| — | 00000 |
| 1 | 00001 |
| 2 | 00010 |
| 3 | 00011 |
| 4 | 00100 |
| 5 | 00101 |
| ⋮ | ⋮ |
| 26 | 11010 |
| 27 | 11011 |
| 28 | 11100 |
| 29 | 11101 |
| 30 | 11110 |
| 31 | 11111 |

FIG.10C

| PAPER SIZE | DATA |
| --- | --- |
| B5 L | 000 |
| B5 R | 001 |
| A4 L | 010 |
| A4 R | 011 |
| B4 L | 100 |
| B4 R | 101 |
| A3 L | 110 |
| — | 111 |

FIG. 10D

| CASSETTE CAPACITY | DATA |
|---|---|
| MANUAL | 000 |
| 250 | 001 |
| 500 | 010 |
| 1000 | 011 |
| 1000 | 100 |
| 2000 | 101 |
| 3000 | 110 |
| — | 111 |

FIG. 10E

| | COVER CONDITION | DATA |
|---|---|---|
| | OPEN | 00 |
| CLOSED | NON-ADF | 01 |
| CLOSED | ADF UNUSED | 10 |
| CLOSED | ADF IN USE | 11 |

FIG. 10F

| SORTER | DATA |
|---|---|
| NON | 00 |
| UNUSED | 01 |
| 15 BIN USE | 10 |
| 20 BIN USE | 11 |

FIG. 10G

| COPY NUMBER | DATA |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| — | 1010 |
| — | 1011 |
| — | 1100 |
| — | 1101 |
| — | 1110 |
| — | 1111 |

IMAGE FORMING APPARATUS ASSESSING WHETHER IT IS NECESSARY TO INSTALL ADDITIONAL PERIPHERAL DEVICE AND INFORMING AN OPERATOR TO THAT EFFECT

BACKGROUND OF THE INVENTION

1. Field of the invention

The present invention relates generally to an image forming apparatus, and more particularly to an image forming apparatus allowing the optional mounting of an appropriate peripheral device to the sizes and quantity of sheets to be copied and other factors, wherein the necessity of a particular peripheral device is assessed by an optional information system. The automatic document feeder will be referred to as "ADF".

2. Description of the prior art

Recently, users want image forming apparatus such as copying machines and printing machines that save labor and time, and users want to purchase peripheral devices by their own option. However, the users' option is arbitrary and may vary from operator to operator. In addition, the necessity of employing these peripheral devices is sometimes wrongly assessed, thereby leading to the purchase of inappropriate peripheral devices.

Peripheral devices includes an ADF, cassettes and sorters. A typical example is an ADF which is very much appreciated for its convenience. The ADF automatically copies originals stacked on a tray, so that it eliminates the bother of manually changing the originals. Owing to the use of an ADF the operator can do other works during the copying.

Another example is a cassette, which stores sheets and then automatically feeds them. Conventional cassettes are prepared in number corresponding to sizes of sheets to be stored, and users must have plural cassettes so as to copy A4, B4, B5 or other size sheets, and attach the necessary cassette to a copying machine or to a printing machine. Some sheet sizes are more often used than others, and some sheet sizes are rarely used at all. Variations in the frequency of use affect the capacity of a required cassette. A cassette must have a larger capacity if it stores sheets of the most frequently used size. On the other hand, if the sheets are of rarely used size, the sheets should not remain in the cassette for a long period of time, otherwise they would deteriorate owing to exposure to air.

A further example is a sorter, which separates copied sheets into groups; for example, when an original of 10 leaves or 10 serial pages is copied into 5 copies, each copy is discharged onto a different tray by the sorter. The sorter saves the bother of separating copied sheets into 5 groups ready for use, such as stapling the sheets into a booklet.

There are at least three methods for assessing the necessity of employing a particular peripheral device, which are as follows:

(1) When an original or originals are copied, the original platen is normally covered with a cover, except when a book is being copied, so as to avoid the movement of the original or the formation of blackened edges on the copied sheet during copying. When the originals are changed leaf by leaf, the cover must be opened and closed by hand. When many leaves are to be copied at one time the operator must repeat the opening and closing of the cover. If the operator must do it over a certain period of time, an ADF should be employed to save the labor and time. Thus, the employment of an ADF is justified.

(2) Another method comprises counting the frequency of turning on a switch for initiating the copying, hereinafter referred to as "print switch". More specifically, when originals are changed leaf by leaf, the turning on and off of the print switch must be repeated. By counting how many times the print switch has been turned on for a predetermined period of time, the frequency of changing originals (leaves) can be determined.

(3) A third method is to count time intervals in the previous copying operation. When the originals are changed leaf by leaf, the operation is stopped, and then starts. The whole operation is carried out at certain time intervals. When the time intervals are short, it shows that many originals are continuously copied.

SUMMARY OF THE INVENTION

The image forming apparatus of this invention, which overcomes the above-discussed and numerous other disadvantages and deficiencies of the prior art, comprises a memory for storing data records about image forming operations for a predetermined period of time, the data including the sizes of sheets, the sizes of originals, the numbers of sheets and the frequency of changing originals; means for calculating the frequency of changing originals continuously for the predetermined period of time on the basis of the data records; means for assessing the necessity of employing the optional peripheral device on the basis of the calculated frequency; and means for informing the user of the assessed necessity for the peripheral device.

In accordance with another aspect of this invention, the image forming apparatus of the invention comprises means for calculating the number of sheets used for a predetermined period of time with respect to each sheet size; and calculating the capacity of a cassette for each sheet size.

Thus, the present invention described herein makes it possible to achieve the objectives of (1) providing an image forming apparatus allowing the optional mounting of a peripheral device appropriate to the size and quantity of sheets and originals and other factors; and (2) eliminating the possibility of wrong selection of a peripheral device on the basis of the operators' arbitrary assessment of the necessity of a particular peripheral device.

BRIEF DESCRIPTION OF THE DRAWINGS

This invention may be better understood and its numerous objects and advantages will become apparent to those skilled in the art by reference to the accompanying drawings as follows:

FIG. 3 shows an arrangement of memory areas for storing the data records of the past copying operation;

FIGS. 4A to 4D are tables showing memories for storing each constituent item of the data records of FIG. 3;

FIGS. 7A and 7B are tables showing reference relations among paper sizes, cassette capacities, non-paper states, and number of copies;

FIG. 8A is a table showing reference relations between paper sizes and data;

FIG. 8B is a table showing reference relations between cassette capacities and data;

FIGS. 10A to 10G are tables showing memories for storing each constituent item of the data records.

DESCRIPTION OF THE PREFERRED EMBODIMENTS

When a print switch is turned on during the copying operation, the date, the size of sheet to be copied, the number of copies input by a ten-key pad, and the open/closed condition of the cover are stored in memory, hereinafter the stored date will be referred to as "data records" or merely "records". The necessity of an ADF is assessed by reference to the records. In the illustrated embodiment a set of four weeks' copying records is referred to.

The records are traced back to the starting point of time, and if it is found that the earliest copy is made on a sheet of the same size and in the same number (two sheets or more) as those of the first sheet in the previous records under condition of having the cover closed, it can be judged that the copying operation covered by the successive records satisfy the requirement of the continuous originals changing and the employment of an ADF is justifiable. If it is found that the copying was made with the cover being opened, it shows that a book was copied. The book copying is not suitable for the employment of an ADF. The total number of copied originals (which is equivalent to how many times the print switch has been turned on) A, the number of continuously copied originals B, and the frequency of continuous copying operations C are in the following relationship:

Continuous copying rate $D=B/A$

Average number of originals for each continuous copying $E=B/C$

The necessity of employing an ADF is assessed from the values of D and E. For example, when the value D is small but the value E is large, it may be concluded that an ADF is necessary, or when the value D is fairly large but the value E is small, it may be determined that an ADF is not necessary.

Figures 1, 2:
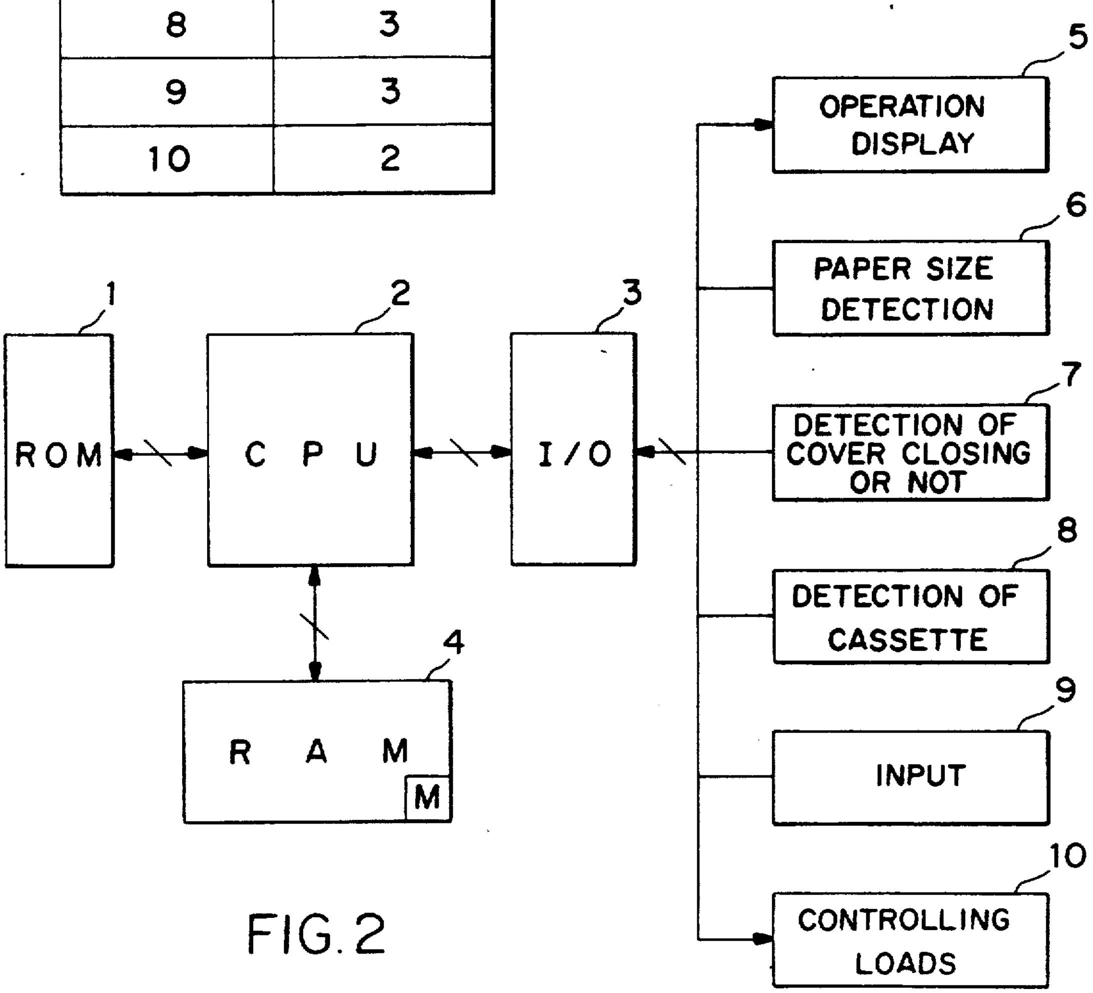
FIG. 1 is a table showing reference relations between continuous copying rates D' and table data F.
FIG. 2 is a block diagram showing the operation of an image forming apparatus according to the present invention.

FIG. 1 is a table showing the criteria for the assessment of the necessity of ADFs. In the table the continuous copy rate D' is calculated according to the following equation, with tenth's place rounded to the nearest whole number:

$$D'=(B\times 10)/A$$

The date F is obtained from the value D', and then the value F is compared with the average number of copies E. If $E\geqq F$, the employment of an ADF is justifiable.

The assessment mechanism and procedure will be more particularly described:

FIG. 2 is a block diagram of a copying apparatus according to the present invention. According to a program stored in ROM 1, CPU 2 holds data read from inputs 5–9 via an I/O 3 and stores data in RAM or turns on or off a load 10 for controlling the copy process stored in RAM 4. RAM 4 has a clock area for clocking time. When the print switch on the operation/display unit 5 is set to operate, the data clocked in the clock area, data about the original size detected by a paper size detector unit 6, the open/closed condition of the cover (including a case where an ADF is mounted) detected by an original cover condition detector 7, and the copy number input from the operation/display unit 5 are stored in the records memory area M. If it is found that the employment of an ADF is justifiable, a display of the unit 5 will indicate this.

FIG. 3 is a diagram showing an arrangement of the records memory area M. When the print switch is operated, items of the records such as the date, paper size, and copy number are written into new addresses.

More specifically, the records memory area M comprises, as shown in FIGS. 4A to 4D, four memory areas each of 8 kbit×8 bit, and storing different data from each other such as dates, paper sizes, and other necessary items. To store them 4 bits and 5 bits are required for months and days, respectively, and accordingly four memories of 8 kbit×8 bit for each item are used to constitute the records. As shown in FIGS. 10A to 10G, the records are written in the memory areas. When the memory area fills up with data, the older data is successively overwritten.

Figure 5A:
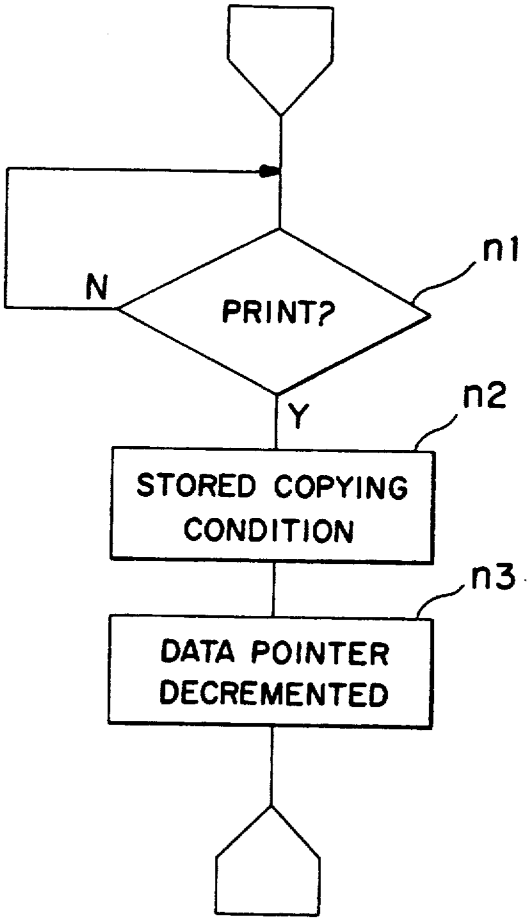
FIGS. 5A to 5C are flowcharts showing a sequence of procedures for assessing the necessity of an ADF.
Figure 5B:
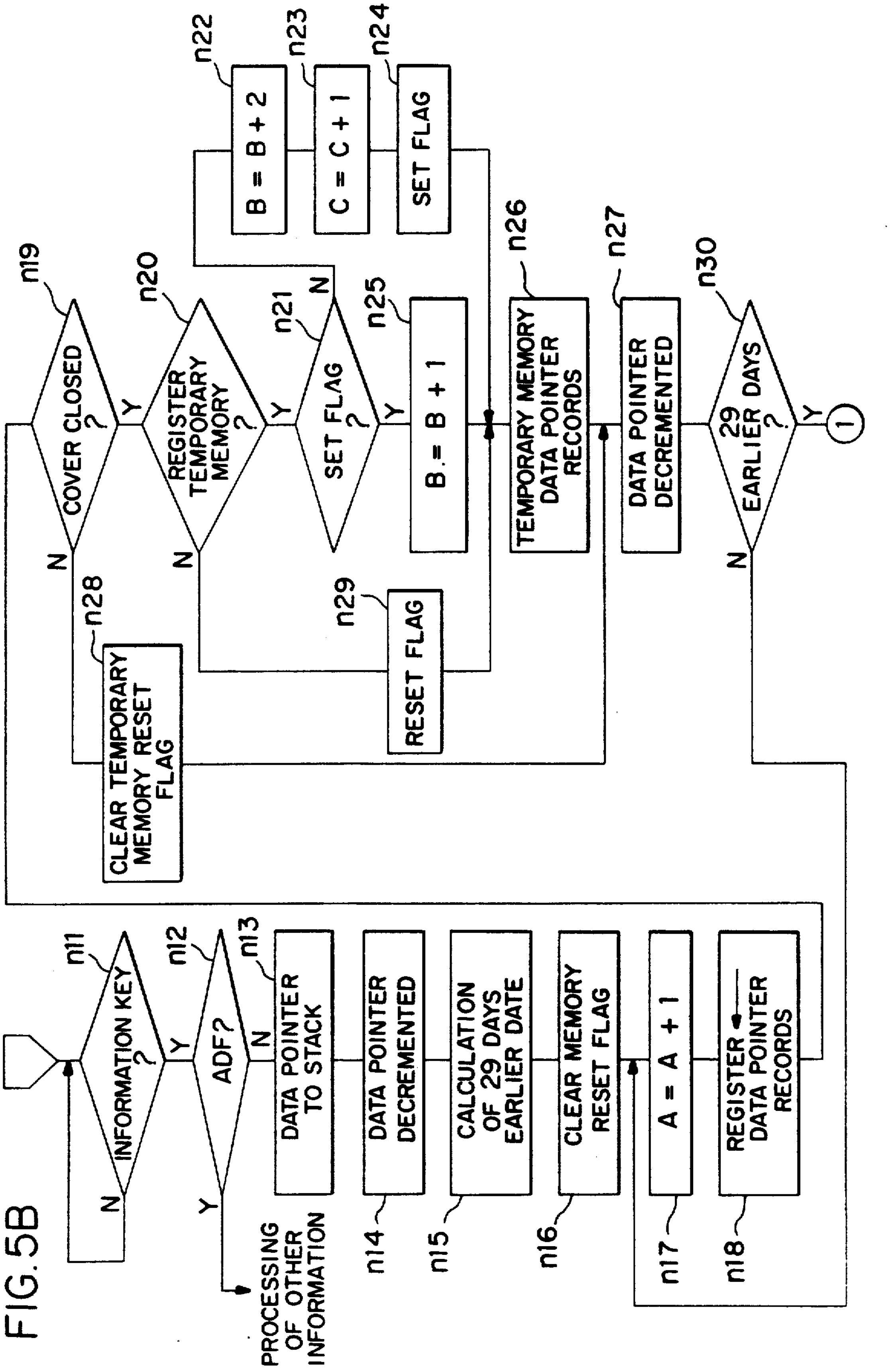
Figure 5C:
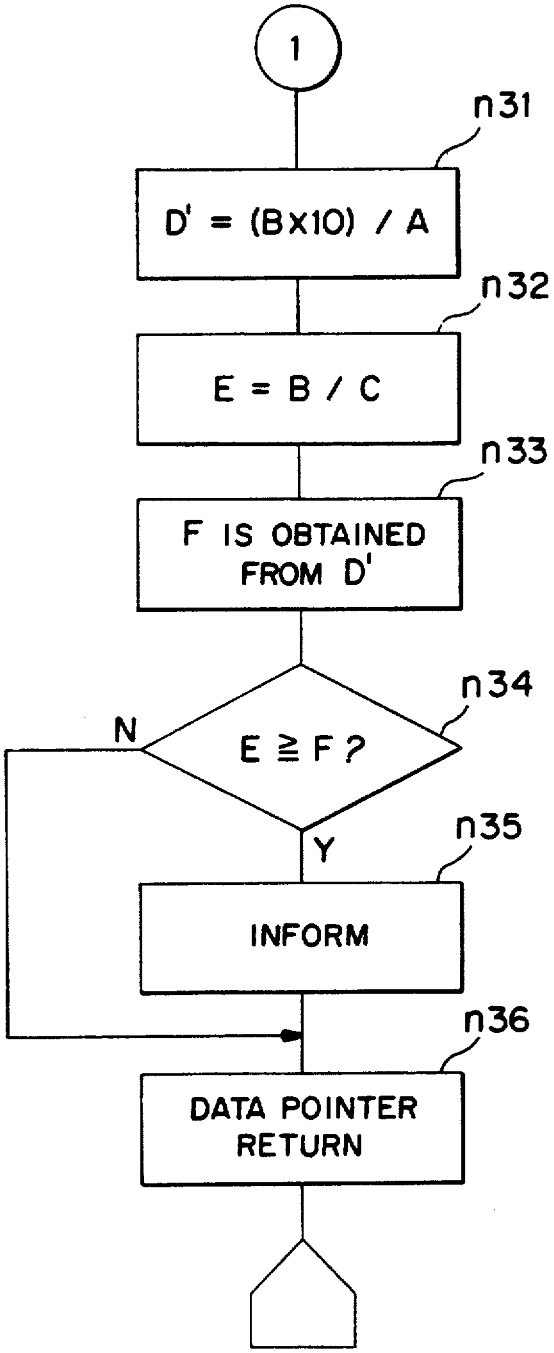

Referring to FIGS. 5A to 5C, the operation of the assessing procedure will be described:

When the print switch is turned on during the copying operation, the immediate copying records are stored in an address identified by a data pointer of CPU 2 (step n1 to step n2). After the copying records have been stored, the data pointer is incremented so as to be ready for the subsequent copying operation (step n3). In this way, items are consecutively stored in new addresses so as to constitute the copying records.

By turning on an optional information key the operation/display unit 5 is operated, and checks if the copying apparatus is equipped with an ADF (step n11 to step n12). If the apparatus already has one, the program advances to the step of an information processing for other peripheral devices, such as a cassette and a sorter. If no ADF is mounted, the program advances to the step where the ADF information is processed. The data pointer is withdrawn to a stack so as to be prepared for the next copying operation and the immediate date is accessed from the memory from which 29 days (4 weeks) date back until the 29th date is ascertained (step n13 to step n15 through step n14). The following steps are the procedure for finding out copying records at the four weeks earlier date. At step n16 the following are reset; areas for storing a total number of copied originals A, a number of copied originals in a continuous copying B, a frequency of continuous copying C, a continuous copy flag, and a temporary memory, wherein the temporary memory stores the paper size and the number of copies in a particular copying operation immediately before the copying records identified by the data pointer.

At step n17 the number of copied originals A is added, and then the records identified by the data pointer is registered at a register of the CPU. By ascertaining whether or not the original was covered, and comparing the records with the paper size and the number of copies (values stored in the temporary memory)

in the immediately preceding copying operation it is determined whether continuous copying was made or not (step n18 to step n20 through step n19). As a result, if it is found that a continuous copying took place, then the steps n21 to n25 are executed; that is, the number of originals in a continuous copying B and the frequencies of continuous copying C are added, respectively, a flag indicating continuous copying in process is set at the start of the continuous copying operation (step n21 to step n23 through step n22). If the continuous copying is already in process, one is added to the number of the continuous copyings B. Since a flag is already set, and the program advances to the next step (step n21 to step n25). Upon completion of the continuous copying, the copying records identified by the data pointer are written in the temporary memory and then the data pointer is decremented (step n26 to step n27).

If the original was copied without using the cover, it shows that no continuous copying took place, and the procedure to be followed is merely to clear the temporary memory and reset the flag. Then the data pointer is decremented to enable the program to proceed to the next steps (step n19 to step n27 through step n28). If the contents of the register are not in agreement with the paper size and the number of copies stored in the temporary memory, in which case the copying operation is not continuous, it is only necessary to reset the flag and the stored date in the temporary memory, and the program will advance to the next steps (step n20 to step n27 through steps n29 and n26).

If the date identified by the data pointer already has reached that sought at step n15, the program advances to step n30 to determine the necessity of an ADF. If the latter date has not been reached, the records identified by the data pointer is compared with those immediately before the copying operation stored in the temporary memory in order to find the continuity of the copying operation.

In this way the values of A, B, and C for the four weeks are obtained in the afore-mentioned manner, from which values D' and E are calculated. The value F corresponding to the value D' is also obtained from the table of FIGS. 5A to 5C (step n31 to step n33 through step n32). The values E and F are compared with each other, and if the employment of an ADF is justified, the display of the unit 5 indicates it. The operator observes the indication and determines whether he should employ it or not. In the CPU the data pointer returns from the stack and becomes prepared for writing the subsequent data records.

The continuity of the past copying operation can also be judged by counting time intervals between one copying operation and the previous copying operation. If the time intervals are below a prescribed limit, it can be determined that continuous copying operation took place. In the illustrated embodiment the data records of the past four weeks are traced back, but the period of time is not limited to four weeks.

Figure 6:
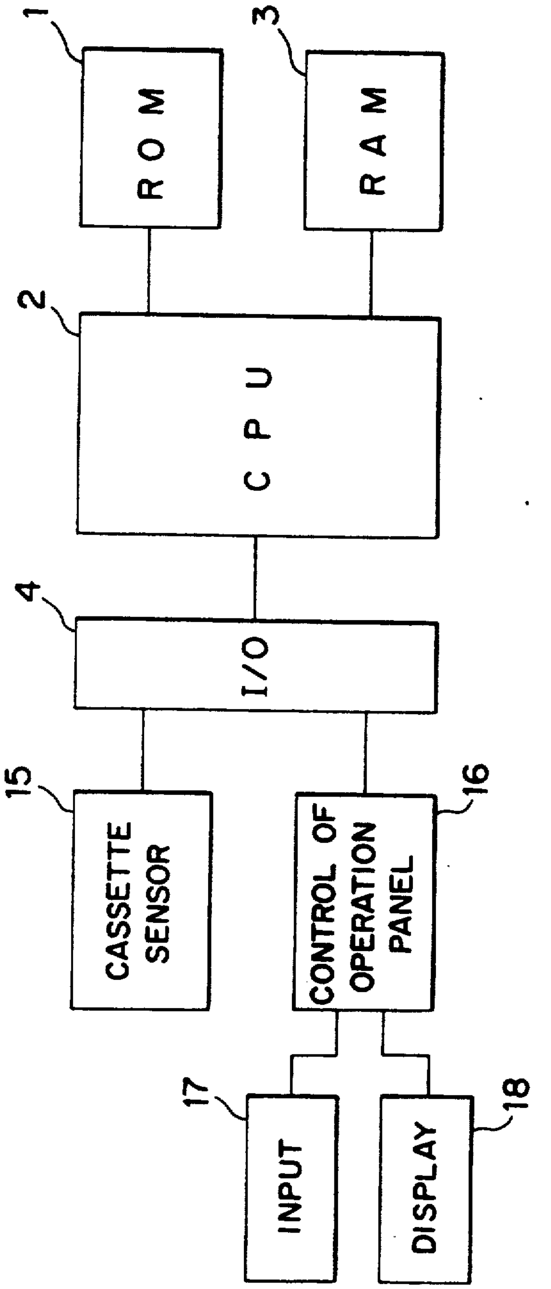
FIG. 6 is a flowchart showing a sequence of procedures for controlling the image forming apparatus according to the present invention.

Referring to FIGS. 6 to 9, another example of the embodiment will be described:

This embodiment is for assessing the employment of a cassette, which stores papers and automatically feeds them. Paper sizes and number are important factors for determining a particular cassette. FIG. 6 is a block diagram showing a control unit of the copying apparatus.

The entire copying apparatus is controlled by CPU 2. The CPU 2 controls the copying operation and other operations in accordance with a program stored in ROM 1. RAM 3 is employed as a working area to execute the program and has a records memory area M for storing the copying records.

The CPU 2 receives information via the I/O 4, the information being sent from a cassette sensor 15 and an operation panel control unit 16. The sensor 15 detects the size and capacity of a cassette mounted on the body of the copying apparatus. Each cassette is provided with marks (such as bar codes and projections) which indicate the size of papers stored in the cassette, the capacity of the cassette, and any other necessary items. The marks are read by the sensor (optical sensor, microswitch or the like) through which they are input to the CPU 2. The operation panel control unit 16 controls the operation panel on the copying apparatus and sends to the CPU 2 information about the on and off conditions of a paper size selector switch, a copy button, and a cassette optional information key, etc. The unit 16 also displays accordingly and displays in response to a display command from the CPU 2.

FIGS. 7A and 7B are diagrams showing copying records storage tables allotted to the RAM 3. The RAM 3 has a memory capacity of $8.192\times8$ bit so that in "0000" to "0FFF" and "1000" to "1FFF" the RAM stores paper size data, copy number data, and any necessary items for a total of 4096 copying operations. The paper size data (3 bits), cassette capacity data (2 bits), non-paper (paper is not present) data (1 bit), and the first two digits copy number data (2 bits) for one copying operation are stored in "1000" to "1FFF". The number of copies is expressed in 10 bits and a maximum of 1024 copies can be stored.

Data about the paper size selected at the time of copying are stored in the paper size data column of a copy number table. FIG. 8A is a table showing the paper sizes and data corresponding thereto. Data about cassette capacities are stored in the cassette capacity data column of a copy quantity table. FIG. 8B is a table showing cassette capacities and data corresponding thereto. A non-paper column is a flag for storing data about the presence or non-presence of papers in the cassette in use. The data about whether or not non-paper condition exists is stored on the basis of a detection by a non-paper sensor (an optical sensor or the like) disposed adjacent to a cassette. If papers run out in the cassette during the copying operation, the shortage is indicated by a display 18 so as to call for a supply of papers. At this stage the copying operation is stopped.

Each time the copying operation is completed, the number of copies is stored in the copy number table. For example, in one copying operation, in "0000" and "1000" a supply of A4R size paper is set in a manual paper feed cassette and 20 copies are produced; and in another copying operation, in "0FFF" and "1FFF" a supply of B5R size paper is set in a 500-sheet capacity cassette and 100 copies are made. In this way, each time the copying operation is completed, copy number data is stored in "0000, 1000" to "0FFF, 1FFF". It will be appreciated from the table that when all the addresses are full data, the older data is consecutively erased so that data about the latest 4096 copying operations are stored.

The number of papers of each size is calculated for a given period of time, on the basis of the data recorded, so as to find an optimum cassette capacity for each paper size. The given period of time may be expressed in terms of the frequency of copying operations. For example, the number of copies made during 128 copying operations is counted. More specifically, the number of copies made from papers of each size is calculated for 4096 copying operations, and the resulting number is divided by 32 to obtain the number of copies of each paper size (or for a given period of time). On the basis of the value calculated in this way, the necessity of employing a particular cassette for each paper size is assessed. If the number of papers of each paper size does not exceed 500 papers, a manual paper feed cassette is suitable for use, but if the number of papers is in the range of 500 to 1000, a 500-paper capacity cassette is justifiable for use.

Figure 9:
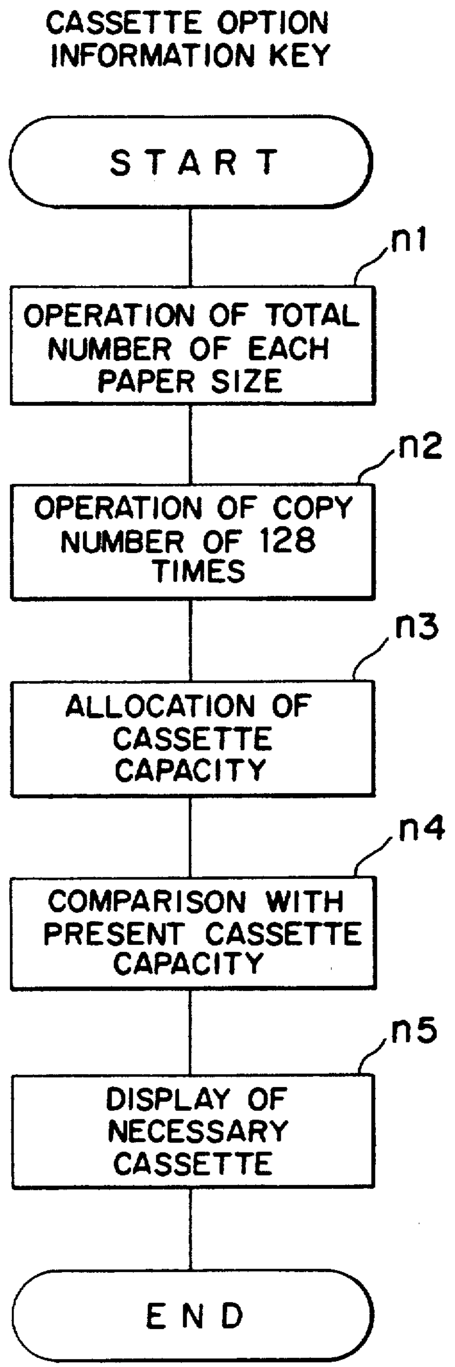
FIG. 9 is a flowchart showing a sequence of procedures for assessing the necessity of a cassette.

FIG. 9 is a flowchart showing the procedure of assessing the necessity of a cassette:

When a cassette optional information key on the copying apparatus is turned on, the total copy number each paper size is first obtained at step n1 for 4096 copying operations. The resulting number is divided by 32 to obtain the number of copies of each paper size for the 128 copying operations (or for a predetermined period of time) (step n2). At step n3, on the basis of the values obtained, the necessary cassette capacity is calculated for each paper size. The resulting values are compared with the cassette capacity table shown in FIG. 8B (step n4), and if it is found that different capacity cassettes are required, the paper sizes and the cassette capacities are displayed on the display 18.

In this way, the necessity of using a cassette is assessed; first, the cassette capacity each paper size is determined on the basis of the past copying records for a predetermined period of time (a period of time for which 128 copying operations were executed), and when the employment of a particular cassette is found justifiable, the cassette requirements are indicated on the display.

As is evident from the foregoing description, the image forming apparatus according to the present invention enables the operator to assess the necessity of employing a peripheral device such as an ADF, cassettes and a sorter, thereby avoiding the arbitrary selection of a particular peripheral device and eliminating the possibility of procuring an inappropriate device for the paper size and the number of copies to be made.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An image forming apparatus the apparatus comprising:

means for mounting peripheral devices to the apparatus;

a memory for storing copying condition data sets sequentially wherein said copying condition data sets include the size of sheets, or size of original, documents, numbers of copies from an original document and number of original documents;

means operatively connected to the memory, for determining whether each data set of said sequential data sets in said memory are of successive copying events or not and for counting said successive copying events in a predetermined period of time;

means operatively connected to said memory, for assessing a necessity of equipping an additional peripheral device based on a criteria involved in said copy condition data set and said successive copying events; and means operatively connected to said memory for informing an operator whether said additional peripheral device is necessary or not.

2. An image forming apparatus with a set of peripheral devices, incapable of equipping an additional peripheral device, the apparatus comprising:

a memory for storing copying condition data sets sequentially, wherein said copying data set including size of sheets or size of original document, numbers of copies from an original document, and number of original documents;

means for determining whether each data set of said sequential data in said memory is of a successive copying event or not, and to count said successive copying events in a predetermined period of time;

means for assessing the necessity of equipping an additional peripheral device based on the criteria involved in said copying condition data and said successive copying events; and means for informing an operator whether said peripheral device is necessary or not.

3. In an image forming apparatus that includes means for allowing mounting of peripheral devices, and a memory for storing copying condition data sets sequentially wherein said copying condition data sets include the size of sheets or size of original documents, number of copies from an original document and number of original documents; the method comprising the steps of:

(a) determining whether each data set of said sequential data sets in said memory is of a successive copying event or not;

(b) counting said successive copying events occurring in a predetermined time;

(c) assessing a necessity of equipping an additional peripheral device based on a criteria-involved in said copying condition data set and said successive copying events; and (d) informing an operator whether said additional peripheral device is necessary or not.

4. The apparatus of claim 1 or claim 2 wherein said peripheral device is an automatic document feeder, paper cassette of different capacity or sorter.

5. The apparatus of claim 1 or claim 2 wherein said data sets further comprises date, cassette capacity, open/close state of an original cover, and state of the sorter.

6. The apparatus of claim 1 or claim 2 wherein said data sets are automatically fed from operation display, document size and direction detector, original cover state detector, paper empty detector, and sorter state detector, and are automatically stored in a memory region in RAM sequentially:

wherein said assessing program for a desired peripheral device in ROM is loaded and automatically run in a CPU by the operator's operation; so as to determine;

whether said peripheral device is necessary or not.

* * * * *